2,919,267
Patented Dec. 29, 1959

2,919,267

POLYMERIZATION CATALYSTS AND PROCESSES

Omar O. Juveland and Edmund Field, Chicago, and Herbert N. Friedlander, Homewood, Ill., assignors to Standard Oil Company, Chicago, Ill., a corporation of Indiana No Drawing. Application March 28, 1956
Serial No. 574,366

4 Claims. (Cl. 260—94.9)

This invention relates to novel polymerization catalysts and polymerization processes. The present invention provides processes suitable for the homo- or heteropolymerization of ethylene. By the processes of the present invention, ethylene can be polymerized to yield normally solid materials of controlled high molecular weight, especially highly crystalline, resinous materials.

In the processes for the polymerization of ethylene and other olefinic hydrocarbons which were published by Prof. Karl Ziegler and his associates, the catalysts comprised essentially a trialkyl aluminum and the salt of a transition metal selected from groups 4, 5 and 6 of the periodic table (note, for example, K. Ziegler et al., Angew. Chemie 67, 541–7 (1955), and Belgian Patent 533,362). In the process described by Ziegler et al., ethylene is polymerized to yield products of widely variant molecular weight ranges, varying from about 2000 to more than 3,000,000, as determined by Staudinger specific viscosity. The fractionation of such a broad spectrum of polyethylenes to secure desired fractions presents considerable technical difficulties and increases the cost of the process in practice. The polyethylene extrusssion machinery currently in use domestically and abroad requires extensive and costly modification to adapt it to the fabrication of polyethylenes having molecular weights in excess of 50,000 or 75,000 or, put another way, melt viscosities in excess of about $10^7$ or $10^8$ poises.

Accordingly, an intensive search has gone forward to find catalysts and processes for the polymerization of ethylene and similar olefins to produce normally solid polymers of a molecular weight range which can be controlled to values such that the products can be readily fabricated in conventional fabrication equipment, especially currently-used polyethylene extrusion machinery. An especial object of this search, which has been satisfied by the present invention, was to find catalysts capable of inducing the polymerization of ethylene to form normally solid polymers having desirable properties as plastics but containing little or no polyethylenes having melt viscosities (determined by the method hereinafter defined) in excess of $10^7$ poises. Another object of our invention is to provide means for the generation of catalysts in situ by an extremely simple method from economical compounds of commerce which can be readily handled without danger, e.g. they do not inflame in air at ordinary temperatures. A further object is to provide means for controlling the average molecular weight or melt viscosity of solid polymers from ethylene or mixtures thereof with comonomers. An additional object is to provide the polymerization art with new, cheap catalysts and methods for the preparation thereof. These and other objects will become apparent from the following description of our invention.

In accordance with our invention, ethylene and the like can be polymerized readily under relatively mild operating conditions to produce commercially desirable solid polymers by contact with catalysts prepared by mixing the following components in an inert liquid medium: (a) calcium hydride, (b) an aluminum halide of a middle halogen, and (c) a salt or salt-like compound of a transition metal selected from groups 4, 5, 6 and 8 of the periodic table, sometimes referred to as "polyvalent metal salts" in this specification.

The aluminum halide which is used is the trichloride, tribromide or chlorobromides. We prefer to use $AlCl_3$ or $AlBr_3$ because they are readily available, cheap and effective. The polyvalent metal salt component of our catalyst is preferably a salt of a metal of group 4 and especially titanium; the preferred salts are the halides and of these $TiCl_4$ or $TiCl_3$ is generally preferred by reason of availability, reasonable cost and high catalytic efficiency in our polymerization process. The inert liquid medium used in our invention is usually a saturated or aromatic hydrocarbon which is a liquid under the polymerization conditions.

The molar ratio of aluminum halide to polyvalent metal salt can range from about 1 to about 15 and is preferably at least about 5. The calcium hydride is supplied in sufficient quantity to provide at least about 1 hydrogen atom per chlorine atom in the mixture from which the active polymerization catalyst is prepared, although the lower practical limit for good polymerization results is a quantity sufficient to provide 1 hydrogen atom per halogen atom in the aluminum halide only. However, very large excesses of the hydride component of the catalyst mixture can be used, e.g. up to about 15 hydrogen atoms per chlorine atom have been used successfully in a mixture of $CaH_2$—$AlCl_3$—$TiCl_4$. The ratios of catalyst components can be related in terms of equivalent fractions. The mols of any component times the positive valence of its metallic element equals the number of equivalents. The total number of equivalents of the catalyst components are added. The equivalent fraction of a catalyst component is then the quotient of the number of its equivalents divided by the total catalyst equivalents in the system. The significance of equivalent fractions is that they represent combining ratios of compounds. When the equivalent fraction of $CaH_2$ in the catalyst mixture is at least 0.5, sufficient hydrogen is theoretically available to react with all the halogen.

The catalyst concentration in the inert liquid medium is generally at least about 2 g. per 100 cc. and usually up to about 15 g. or even more per 100 cc.

The mixture of catalyst components is allowed to interact in the inert liquid medium at a temperature between about 50° C. and about 175° C., under an inert gas blanket or in the presence of the olefin to be polymerized. Thus, under an ethylene pressure of 1 p.s.i.g., the catalyst components are heated to about 90° C. to effect interaction, but under an ethylene pressure of 50 p.s.i.g., the catalyst components interact at about room temperature (25° C.) to yield an effective polymerization catalyst. The catalyst components can be allowed to interact in the presence of various stabilizing agents other than the olefin to be polymerized, e.g. other olefinic hydrocarbons, especially conjugated dienes such as butadiene, isoprene, styrene, indene or the like.

The polymerization process of our invention can be effected over the temperature range of about 20° C. to about 175° C., but generally we use temperatures in the range of about 50° C. to about 125° C. It will be understood that the optimum temperature for the polymerization operation can readily be determined by simple tests when the other reaction variables have been determined, e.g. the specific feed stock, catalyst components in defined ratios, inert medium, etc., bearing in mind also the specifications set on the final product of polymerization.

The olefin polymerization pressure can vary from less than one atmosphere, e.g. ½ atmosphere, to very high pressures of the order of 10,000 p.s.i.g., 15,000 p.s.i.g. or even more. We have found, however, that even with a gas such as ethylene, the polymerization pressure can conveniently be set at about 1 to about 1000 p.s.i.g., e.g. 10–100 p.s.i.g., while maintaining a high rate of polymerization and producing normally solid polymers having very desirable properties for commercial uses.

The reaction period can readily be varied to obtain desired results in the polymerization operation. In general, under otherwise constant polymerization conditions, the introduction of ethylene monomer over an extended period of time results in the gradual production of solid polyethylenes in the reaction mixture in increasing amounts. An unexpected feature of the present polymerization process, however, is the fact that the average melt viscosity of the polymer which is produced increases with the reaction period, it being understood that over the course of this period ethylene is introduced intermittently or continuously into the reaction mixture. Thus by simply controlling the reaction period in a system whose variables are otherwise fixed, it is possible to achieve accurate control of the average melt viscosity of the polymer. Stated otherwise, it appears that the average catalyst age affects the average melt viscosity of the polymer which is produced. In the aluminum alkyl titanium tetrachloride and equivalent catalytic polymerizations of ethylene, the ethylene polymerization rate is enormous and, to all practical intents, is uncontrollable so that the average melt viscosity of the polyethylene product can not be pre-determined or simply controlled.

Our invention is specifically illustrated by polymerization experiments (termed "runs") which are tabulated hereinafter.

Except as otherwise indicated, the runs presented in Table 1 were carried out in a stirred, glass pressure flask (100 cc. capacity) under an ethylene pressure of 50 p.s.i.g. using 40 cc. of pure, dry n-heptane as the liquid reaction medium and a catalytic mixture of calcium hydride, aluminum chloride and titanium tetrachloride. In these runs, initially an exothermic reaction takes place upon introduction of ethylene at the stated pressure, increasing the temperature in the liquid medium from room temperature to values between about 60° C. and about 90° C., except as otherwise indicated. Thereafter, a smooth polymerization occurs. Ethylene was pressured into the reaction flasks intermittently over the course of the reaction period, which was 6 hours, unless otherwise indicated. In each instance the reactor contents were decomposed with methanol at room temperature and the resultant mixture was then placed in a high speed agitator (Waring Blendor) with methanol, concentrated aqueous hydrochloric acid and n-hexane. The resultant mixture was agitated, then transferred to a separatory funnel and washed twice with water. The water-insoluble material (solid polymer and hexane) was then filtered and the solid polymer was then washed with more hexane. The hexane filtrate was then evaporated to determine the yield of grease-like polyethylenes, if any. The extracted solid polyethylenes were finally washed with acetone and dried.

TABLE 1

ETHYLENE POLYMERIZATION WITH $CaH_2$–$AlCl_3$–$TiCl_4$ CATALYSTS

| Run | Grams of— | | | Centimols of— | | | $AlCl_3/TiCl_4$ | | H Total Cl | Solid Polymer yield, g. | Polymer properties | | Remarks |
|---|---|---|---|---|---|---|---|---|---|---|---|---|---|
| | $CaH_2$ | $AlCl_3$ | $TiCl_4$ | $CaH_2$ | $AlCl_3$ | $TiCl_4$ | By wt. | Molar | | | $d(24/4°\ C.) \times 10^4$ | Melt viscosity, poises* | |
| 1 | 5.7 | 1.5 | 0.36 | 13.6 | 1.12 | 0.19 | 4.17 | 5.9 | 6.6 | 25.5 | 9,415 | $2.2 \times 10^5$ | |
| 2 | 2.9 | 1.5 | 0.36 | 6.9 | 1.12 | 0.19 | 4.17 | 5.9 | 3.25 | 14.9 | 9,509 | $1.25 \times 10^6$ | $CaH_2$ variation. |
| 3 | 5.7 | 1.5 | 0.17 | 13.6 | 1.12 | 0.09 | 8.82 | 12.6 | 7.3 | 9.22 | 9,723 | $4.2 \times 10^5$ | $TiCl_4$ variation. |
| 4 | 5.7 | 1.5 | 0.09 | 13.6 | 1.12 | 0.047 | 16.7 | 23.8 | 7.67 | 6.25 | 9,631 | $1.5 \times 10^5$ | Do. |
| 5 | 4.3 | 4.6 | 1.09 | 10.2 | 3.45 | 0.58 | 4.22 | 6.0 | 1.61 | 23.1 | 9,562 | $1.8 \times 10^5$ | |
| 6 | 3.15 | 0.9 | 1.4 | 7.5 | 0.68 | 0.74 | 0.64 | 0.91 | 3 | 10 | 9,561 | $5.5 \times 10^5$ | Pressure=1 p.s.i.g.; 47–90° C.; 5 hours. |
| 7 | 1.44 | 3.0 | 0 | 3.43 | 2.24 | 0 | | | 1.02 | 0 | | | No $TiCl_4$. |
| 8 | 4.3 | 0 | 1.09 | 10.2 | 0 | 1.09 | 0 | | 4.67 | Trace | | | No $AlCl_3$. |
| 9 | 1.44 | 1.5 | 0.36 | 3.4 | 1.12 | 0.19 | 4.17 | 5.9 | 1.65 | 21.2 | | $3 \times 10^3$ (est.) ($N_{sp}$ 7,300). | Low H/Cl (total) and low catalyst concentration. |
| 10 | 1.44 | 1.5 | 0.17 | 3.4 | 1.12 | 0.09 | 8.82 | 12.6 | 1.83 | 4.4 | 9,826 | $4 \times 10^3$ | Low $CaH_2$ and low $TiCl_4$. |
| 11 | 0.72 | 1.5 | 2.18 | 1.71 | 1.12 | 1.15 | 0.69 | 0.97 | 0.43 | 12.9 | | $10 \times 10^2$ (est.) ($N_{sp}$ 4,000). | Low H/Cl (total) and low catalyst concentration. |
| 12 | 0.72 | 1.5 | 0.28 | 1.71 | 1.12 | 0.15 | 5.36 | 7.64 | 0.86 | 11.0 | | $9 \times 10^2$ (est.) ($N_{sp}$ 5,700). | Do. |
| 13 | 0.72 | 1.5 | 0.14 | 1.71 | 1.12 | 0.074 | 10.72 | 15.3 | 0.93 | 6.0 (also 5 g. oil). | 9,225 | $1.4 \times 10^4$ | Do. |
| 14 | 1.4 | 0.37 | 0.09 | 3.34 | 0.27 | 0.047 | 4.11 | 5.85 | 6.68 | 0.12 (also 3.5 g. grease). | | | Also 3.5 g. grease. Temperature (27–30° C.) too low to make catalyst. |
| 15 | 1.44 | 6.1 | 1.09 | 3.4 | a 2.28 | 0.575 | 5.6 | 7.96 | | 3.5 | 10,348 | $1.4 \times 10^7$ | a $AlBr_3$ used in lieu of $AlCl_3$. |

*Melt viscosities were determined at 145° C. by the method of Dienes and Klemm, J. Appl. Physics 17, 458–71 (1946).

It is believed that the data of Table 1 are essentially self-explanatory. However, some orienting commentary may be helpful to those skilled in the art. It will be noted from run 1 that the process of the invention readily produces polyethylenes of commercially desirable melt viscosity and density under relatively mild and easily attainable reaction conditions. The comparison of run 2 with run 1 indicates that, under these conditions, a reduction in the concentration of the calcium hydride somewhat reduced the yield of polyethylenes but did not markedly affect the polymer properties. A comparison of each of runs 3 and 4 with run 1 indicates the trend in yields and product properties induced by variation in the titanium tetrachloride concentration in the reactor. In run 5 the polymer yield and properties are comparable with run 1 despite the fact that the concentration of the metal halides was tripled while the calcium hydride concentration was reduced somewhat to provide an atomic ratio of hydrogen to total chlorine of only 1.6 compared with 6.6 in run 1.

Run 6 was performed in a 100 cc. cylindrical glass flask having a round bottom, containing 50 cc. of n-octane. The reaction period was 5 hours, ethylene pressure was 1 p.s.i.g. and the reaction was carried out for the most part at 47° C. after heating the reactor contents initially to 90° C. to effect interaction of the catalyst components in the presence of ethylene to form the active catalyst. It will be noted that even under this very low polymerization pressure, ethylene polymerized at a desirable rate to yield a polymer having commercially attractive properties.

In each of runs 7 and 8, no polyethylene was produced because of the omission, respectively, of titanium tetrachloride and aluminum trichloride in the preparation of catalysts.

Run 9 is comparable with run 5 on a polymer yield basis but it will be noted that the melt viscosity of the polymer was sharply reduced as a result of the reduced concentration of catalyst components by about two-thirds in the reaction system. It will be noted, however, that at a slightly lower catalyst concentration but at about twice the hydrogen:total chlorine ratio (run 2), the polymer properties were very desirable although the yield was somewhat reduced.

A comparison of run 10 with run 9 shows that reduction in the titanium tetrachloride concentration reduced the yield of polymer sharply but did not apparently affect the melt viscosity.

In runs 11 to 13, inclusive, in which the hydrogen:total chlorine ratios were below one in the catalytic mixture, the melt viscosities of the polymers were low.

In run 14 the temperature of the catalyst components was not allowed to exceed 30° C. It is obvious from the results of this run that very little catalyst was formed in the reactor since the yield of solid polyethylene was low and essentially grease-like polymers were produced.

Run 15 shows the successful substitution of aluminum bromide for aluminum chloride in the preparation of polyethylenes having desirable properties.

Data concerning further ethylene polymerization runs with catalysts derived from $CaH_2$—$AlCl_3$—$TiCl_4$ are presented in Table 2. Where higher temperatures are shown first in the table, the reaction mixture was initially heated to the higher temperature to prepare the active catalyst and polymerization was then effected at the indicated lower temperature.

Runs 16 to 20, inclusive, were conducted at essentially atmospheric pressure. Runs 21 and 22 were conducted under an ethylene pressure of 1000 p.s.i.g. A comparison of runs 21 and 22 indicates the effects of increasing the reaction period on the melt viscosity of the polyethylenes, even though the catalyst concentration in the latter run was only about one-fifth that of the former run.

Run 23 was a relatively high temperature, high pressure operation with a good balance of the catalyst ingredients, and good polymerization results were obtained. The same may be said of run 24. In run 25, the molar ratio of $AlCl_3$ to $TiCl_4$ (one) being marginal, the molecular weight of the polymer was low. In run 26, in which less than 1 mol of $AlCl_3$ was used per mol of $TiCl_4$, the yield of polymer was low.

TABLE 3

ETHYLENE POLYMERIZATION WITH $CaH_2$—$AlCl_3$—$TiCl_4$ CATALYSTS

| Run | Grams of— | | | Solid Polymer Yield, g. | Polymer Properties | | Remarks |
|---|---|---|---|---|---|---|---|
| | $CaH_2$ | $AlCl_3$ | $TiCl_4$ | | $d(24/4°\ C.) \times 10^4$ | Melt Viscosity, Poises | |
| 27 | 3.5 | 7.4 | 8.0 | 12.8 | greasy | $7 \times 10^3$ (est.) | 3.8 g. grease; $N_{sp}$ 8,800. |
| 28 | 3.2 | 10.0 | 6.1 | 3.0 | 9,230 | $7 \times 10^4$ | 3.7 g. grease. |
| 29 | 3.7 | 11.1 | 3.7 | 19.4 | 9,441 | $1.15 \times 10^5$ | 6.8 g. grease. |
| 30 | 2.6 | 13.3 | 3.6 | 2.6 | 10,340 | $1.4 \times 10^6$ | 3.9 g. oil. |
| 31 | 1.6 | 16.6 | 3.4 | 14.2 | 9,492 | $3.2 \times 10^5$ | 7.0 g. oil. |
| 32 | 1.0 | 14.4 | 5.9 | 4.0 | 9,591 | $1.45 \times 10^5$ | 13.6 g. oil. |
| 33 | 2.1 | 11.1 | 7.1 | 13.7 | greasy | $2 \times 10^2$ (est.) | 12.4 g. oil; $N_{sp}$ 4,400. |
| 34 | 2.9 | $AlF_3$ 0.95 | 0.36 | 0.1 | | | 0.2 g. grease. |
| 35 | 2.9 | $AlI_3$ 4.6 | 0.21 | trace | | | |

Runs 27–33, inclusive, in Table 3 were performed in 100 cc. glass pressure flasks containing 40 cc. of dry heptane under an ethylene pressure of 50 p.s.i.g. An exothermic reaction occurred in each instance, sending the temperature up to 90–100° C. The reaction period was 5 hours in each run.

Runs 27–33, inclusive, were carried out with equivalent fractions of calcium hydride which were at most equal to the equivalent fraction of $AlCl_3$ in the reaction zone. Consequently, considerable oil and grease products were produced and the yields of solid polyethylenes were low.

Runs 34 and 35 were carried out as runs 27–33 except that the reactor contents were heated to 90° C. (for lack of an exothermic reaction) and were discontinued after about 2 hours, since little or no pressure drop was noted. These runs indicate that $AlF_3$ and $AlI_3$ can not be used as practical replacements for $AlCl_3$ or $AlBr_3$ in our process.

In Table 4 are presented data obtained by substitution

TABLE 2

ETHYLENE POLYMERIZATION WITH $CaH_2$—$AlCl_3$—$TiCl_4$ CATALYSTS

| Run | Grams of— | | | Liquid Reaction Medium | Vol., cc. | Reactor [1] | Press., p.s.i.g. | Temp., °C. | Reaction Period, Hours | Solid Polymer Yield, g. | Polymer Properties | |
|---|---|---|---|---|---|---|---|---|---|---|---|---|
| | $CaH_2$ | $AlCl_3$ | $TiCl_4$ | | | | | | | | $d(24/4°\ C.) \times 10^4$ | Melt Viscosity, Poises |
| 16 | 3.78 | 2.0 | 3.6 | Heptane | 50 | Glass, Flask [2] | 1 | 86–50 | 4 | 6.3 | 9,526 | $6.1 \times 10^5$. |
| 17 | 3.15 | 1.34 | 0.95 | Octane | 50 | do [2] | 1 | 90–47 | 5 | 5.1 | 9,564 | $5.3 \times 10^6$. |
| 18 | 3.15 | 2.0 | 0.25 | do | 50 | do [2] | 1 | 90–47 | 5 | 0.7 | | ($2 \times 10^6$ est.) $N_{sp}$ 28,500. |
| 19 | 7.55 | 8.0 | 2.9 | Heptane | 50 | do [2] | 1 | 86–50 | 4 | 19.94 | 9,492 | $1.2 \times 10^6$. |
| 20 | 94.5 | 27.0 | 45 | do | 1,500 | 3-liter Resin Kettle. | 1 | 90–50 | 24 | 176 | 9,506 | $2.1 \times 10^5$. |
| 21 | 6.3 | 1.8 | 2.9 | Octane | 100 | 250 cc. Magne-Dash. | 1,000 | 125–100 | 1¾ | 32 | 9,651 | $2.3 \times 10^4$. |
| 22 | 1.26 | 0.36 | 0.57 | do | 100 | do | 1,000 | 150–102 | 12 | 25 | 9,589 | $3.5 \times 10^5$. |
| 23 | 1.26 | 1.33 | 0.5 | do | 100 | do | 1,000 | 150–100 | 18 | 22.0 | 9,697 | $1.35 \times 10^6$. |
| 24 | 1.26 | 2.0 | 2.1 | do | 100 | do | 1,000 | 150–102 | 11 | 22.3 | 9,785 | $5.05 \times 10^5$. |
| 25 | 1.26 | 1.0 | 1.42 | do | 100 | do | 1,000 | 150–102 | 18 | 18.7 | | ($3 \times 10^2$ est.) $N_{sp}$ 4,800. |
| 26 | 0.42 | 0.12 | 0.19 | do | 100 | do | 1,000 | 150–102 | 42 | 0.94 | | $5.8 \times 10^7$. |

[1] All reactors were provided with agitators (100 r.p.m.).
[2] 100 cc. capacity cylindrical flask with round bottom.

of typical transition metal salts selected from groups 5 and 6 of the periodic table for titanium chloride.

TABLE 4

ETHYLENE POLYMERIZATION WITH CaH$_2$—AlCl$_3$—X CATALYSTS

| Run | CaH$_2$, g. | AlCl$_3$, g. | Salt, g. | | Temp., °C. | Solid Polymer Yield, g. | Polymer Properties | |
|---|---|---|---|---|---|---|---|---|
| | | | | | | | $d(24/4°$ C.) $\times 10^4$ | Melt Viscosity, Poises |
| 36 | 5.76 | 1.5 | VCl$_4$ | 0.37 | 26 | 6.0 | 9,664 | $1.12 \times 10^7$ |
| 37 | 5.7 | 1.5 | WCl$_6$ | 0.35 | 90 | 3.6 | 9,544 | $1.18 \times 10^8$ |

The runs in Table 4 were performed in 100 cc. glass pressure flasks containing 40 cc. dry heptane with an ethylene pressure of 50 p.s.i.g. for 20 hours.

Run 38

A glass pressure flask of 100 cc. capacity was charged with 50 cc. of dried n-heptane and with the following compounds in the following amounts at room temperature:

| | Grams | Centimols |
|---|---|---|
| SrH$_2$ | 6.1 | 6.8 |
| AlCl$_3$ | 1.5 | 1.12 |
| TiCl$_4$ | 0.36 | 0.19 |

The ratio of atoms of hydrogen to total atoms of chlorine is 3.3. Ethylene was introduced to the pressure of 50 p.s.i.g. and the reactor contents were heated with stirring at 80 to 95° C. for 48 hours. Over this extended reaction period there were produced only 1.4 g. of a solid polymer from ethylene having a melt viscosity of $1.9 \times 10^8$ poises.

Run 39

Run 38 was repeated but an equimolar proportion of barium hydride was used in place of the strontium hydride. In spite of the extended reaction period, only 0.21 g. of solid polyethylenes were formed.

Runs 38 and 39 demonstrate the extremely surprising fact that calcium hydride functions catalytically in a wholly unexpected manner. The results obtained with calcium hydride according to this invention are even more surprising in view of the known greater chemical reactivity of strontium hydride and barium hydride.

Although the novel catalysts and polymerization processes of the present invention have been generally described and specifically illustrated above, it will be appreciated that the invention is capable of very substantial extension therefrom.

Various monomers can be polymerized with ethylene and may be present in the reaction mixture in concentrations up to about 30 or 40 mol percent, based on ethylene.

Vinyl alkene monomers which may be copolymerized with ethylene by the present polymerization process have the generic formula $$RCH=CH_2$$

wherein R is hydrogen or an alkyl radical. Specifically, suitable vinyl alkene feed stocks comprise ethylene, propylene, isobutylene, 1- or 2-butene, 1- or 2-pentene, 2-methyl-2-butene, 1-hexene, t-butylethylene, tetrafluoroethylene and mixtures of one or more of these alkenes, or the like.

The process of the present invention can also be applied to mixtures of ethylene with polyolefinic hydrocarbons, especially conjugated alkadienes such as 1,3-butadiene, isoprene, piperylene, 4-methyl-1,3-pentadiene or to non-conjugated alkadienes such as 1,5-hexadiene or the like.

Vinyl arenes are suitable feed stocks for use as comoners with ethylene. Examples of vinyl arenes are styrene, nuclearly alkylated (especially methylated) styrenes, nuclearly halogenated styrenes and the like.

It will be understood that the various comonomers are not equivalents for the purposes of our invention and vastly different polymers can be secured by varying the feed stock. Our invention is especially useful when the monomer is ethylene or a mixture thereof with up to about 30 volume percent of a normally gaseous, unbranched 1-alkene, especially propylene.

Salts of the following metals can be used in the preparation of polymerization catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salts of said metals. We can employ the metal salts of various mineral acids, for example, the hydrohalogen acids; oxyhalides, e.g., titanyl chloride or vanadyl chloride and the like; salts of acids of phosphorus, sulfur, nitrogen, etc. We may also use the specified metal cyanides, cyanates, isocyanates, thiocyanates, isothiocyanates, azides, etc. The salts of carboxylic or sulfonic acids may also be used. Also, we may use metal derivatives, classified herein as salts, having the formula $M(OR)_n$, wherein M represents the polyvalent metal, R is an alkyl or aryl radical, and $n$ is the valence of M, for example, $Ti(OC_2H_5)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

In addition to or in lieu of the aforesaid metal salts, we may employ freshly precipitated oxides of hydroxides of said metals, which can be prepared by techniques which are well known in inorganic chemistry.

It will be understood that the various transition metal salts are not precise equivalents for one another for the purposes of our invention. Because of their relatively high efficiency, we prefer to use salts, especially halides, of group 4 transition metals, of which halides of titanium are preferred.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. Thus, AlCl$_3$ may be sublimed onto a calcined gamma-alumina, to provide a concentration of about 1 to about 10 weight percent thereon, and the resulting supported AlCl$_3$ can be used in the preparation of catalysts for the purposes of our invention. The added solid material can comprise from about 10 to 2000 weight percent, based on the weight of the materials which are allowed to react to form the polymerization catalysts.

In some cases, maximum catalytic activity can be attained by depositing or sorbing the polyvalent metal salt and/or aluminum halide on the surface of a solid material, e.g. by stirring a solution or dispersion of said polyvalent metal salt with the finely-divided solid support, thereafter adding the alkaline earth metal hydride thereto in an inert liquid medium.

Polymerization is preferably performed in the presence of various reaction media which are liquid under the selected polymerization conditions of temperature and pressure. We prefer to employ relatively inert liquid reaction media such as saturated hydrocarbons (alkanes and cycloalkanes), aromatic hydrocarbons, relatively unreactive alkenes, or cycloalkenes, perfluorocarbons, chloroaromatics or mixtures of suitable liquids.

The polymeric products produced by the processes encompassed within the scope of our invention can be subjected to a variety of treatments designed to remove all or part of the catalytic materials therefrom. Thus the polymers can be washed with methanol, alcoholic alkalies, or the like in order to convert halide salts to the corresponding metal hydroxides. Hot acetic acid extraction of ash from the polymers may also be practiced.

The solid polymeric products can be dissolved in hot solvents, for example in unreactive hydrocarbons such as saturated or aromatic hydrocarbons, and the resultant solutions can be treated to separate polymer having relatively low content of material derived from the catalyst components. Thus hot hydrocarbon solutions of polymer can be subjected to the action of various hydrolytic agents to precipitate metal hydroxides which can then be separated from the remaining solution by centrifuging, decantation, filtration or other means. Alternatively, the hot hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials originally present in the polymer. The solvent can be recovered from the aforesaid operations and can be reused.

A desirable method for working up normaly solid polymers of ethylene is to prepare a hot solution thereof in a normally liquid alkane, particularly in the $C_6$–$C_{12}$ range, having a solute concentration of the order of 2 to 3 weight percent, thereafter to filter said solution through a conventional filter medium (optionally with an added filter aid) to remove suspended particles derived from the polymerization catalyst, thereafter to contact the filtrate with an adsorbent filter aid ($Al_2O_3$, $SiO_2$ gel, Celite, etc.) in order to effect selective adsorption of colloidal polymer particles from the hot filtrate, thereafter to filter the hot filtrate and treat it to recover the purified ethylene polymer remaining in solution. This object can be achieved simply by cooling the filtrate to produce a precipitate of white polyethylene which is readily filterable by conventional methods.

It will be understood that various fractions of the normally solid polymers produced by the process of the present invention can be precipitated from solutions thereof in hydrocarbon solvents or other solvents by lowering the temperature in a multiplicity of stages. The fractions which leave the solution at the higher temperatures have a higher average molecular weight and melt viscosity than those which are precipitated from solution at lower temperatures.

The polymers of the present invention can be used or treated as the polymers whose preparation is described in U.S. Patent 2,691,647 of Edmund Field and Morris Feller, granted October 12, 1954.

Having thus described our invention, we claim:

1. In a polymerization process, the steps of contacting ethylene under polymerization reaction conditions with an inert liquid reaction medium containing a catalyst consisting essentially of calcium hydride, an aluminum halide selected from the group consisting of aluminum trichloride, aluminum tribromide and aluminum chlorobromides and a member of the group consisting of the chlorides of titanium, vanadium and tungsten, the molar ratio of said aluminum halide to said chloride being at least about 1, the equivalent fraction of said calcium hydride being at least equal to the equivalent fraction of said aluminum halide in the catalyst mixture.

2. A process for the preparation of a normally solid polymer which comprises contacting ethylene with an inert liquid reaction medium containing a catalyst consisting essentially of calcium hydride, an aluminum halide selected from the group consisting of aluminum trichloride, aluminum tribromide and aluminum chlorobromides and a chloride of titanium, the molar ratio of said aluminum halide to said titanium chloride being between about 1 and about 15 and the equivalent fraction of said calcium hydride being at least equal to 0.5 in the catalyst mixture, effecting said contacting at a temperature between about 20° C. and about 175° C. until a substantial proportion of ethylene has been converted to said normally solid polymer, and separating a normally solid polymer thus produced.

3. The process of claim 2 wherein reaction is continued for a period of time sufficient to produce a polyethylene product having a melt viscosity between about $10^4$ and about $10^7$ poises.

4. A process for the homopolymerization of ethylene to a tough, resinous polymer having a melt viscosity between about $10^4$ and about $10^7$ poises and a density (24/4° C.) not less than 0.94, with not more than about 20 weight percent of ethylene polymerization products having melt viscosities and densities outside the aforesaid ranges, which process comprises contacting ethylene in a liquid hydrocarbon reaction medium with a catalyst consisting essentially of calcium hydride, aluminum chloride and titanium tetrachloride, the molar ratio of aluminum chloride to titanium tetrachloride being between about 5 and about 10, the amount of calcium hydride being sufficient at least to provide one hydrogen atom per chlorine atom in the catalyst mixture, continuing said contacting at a temperature between about 20° C. and about 175° C. until said polymer has formed, and recovering a resinous polymer thus produced.

References Cited in the file of this patent

UNITED STATES PATENTS

| | | |
|---|---|---|
| 2,456,326 | Rupp | Dec. 14, 1948 |
| 2,542,610 | Young | Feb. 20, 1951 |
| 2,577,591 | Sailors | Dec. 4, 1951 |
| 2,700,663 | Peters | Jan. 25, 1955 |
| 2,710,854 | Seelig | June 14, 1955 |
| 2,827,447 | Nowlin et al. | Mar. 18, 1958 |
| 2,832,759 | Nowlin et al. | Apr. 29, 1958 |
| 2,846,427 | Findlay | Aug. 5, 1958 |

FOREIGN PATENTS

| | | |
|---|---|---|
| 534,792 | Belgium | Jan. 31, 1955 |